US008756120B2

(12) United States Patent
Ntawanga et al.

(10) Patent No.: US 8,756,120 B2
(45) Date of Patent: Jun. 17, 2014

(54) HYBRID CONTEXT-SENSITIVE MATCHING ALGORITHM FOR RETRIEVING PRODUCT CATALOGUE INFORMATION

(75) Inventors: Felix Ntawanga, Pretoria (ZA); Ernest Ketcha Ngassam, Centurion (ZA); Jan Harm Petrus Eloff, Pretoria (ZA); Marek Piotr Zielinski, Pretoria (ZA)

(73) Assignee: SAP AG, Walldorf, DE (US)

( * ) Notice: Subject to any disclaimer, the term of this patent is extended or adjusted under 35 U.S.C. 154(b) by 381 days.

(21) Appl. No.: 13/286,951

(22) Filed: Nov. 1, 2011

(65) Prior Publication Data

US 2013/0110683 A1 May 2, 2013

(51) Int. Cl.
*G06Q 30/00* (2012.01)
*G06Q 30/06* (2012.01)
*G06Q 30/02* (2012.01)
*G06F 17/30* (2006.01)

(52) U.S. Cl.
CPC ........ *G06Q 30/0603* (2013.01); *G06Q 30/0641* (2013.01); *G06Q 30/0252* (2013.01); *G06Q 30/0257* (2013.01); *G06Q 30/0601* (2013.01); *G06Q 30/02* (2013.01); *G06Q 30/0273* (2013.01); *G06Q 30/0613* (2013.01); *G06Q 30/0621* (2013.01); *G06Q 30/0625* (2013.01); *G06Q 30/0631* (2013.01); *G06F 17/30867* (2013.01); *G06F 17/30566* (2013.01); *G06F 17/30126* (2013.01); *G06F 17/30613* (2013.01)
USPC ... 705/27.1; 705/26.1; 705/14.51; 705/14.53; 705/14.55; 705/14.64; 345/441; 707/E17.017; 707/E17.018; 707/E17.109; 707/609; 707/622

(58) Field of Classification Search
CPC .............. G06Q 30/02; G06Q 30/0609; G06Q 30/0633; G06Q 30/06; G06Q 30/0207; G06Q 30/0233; G06Q 30/0601; G06Q 30/0613; G06Q 30/0603; G06Q 30/0641; G06Q 30/0621; G06Q 30/0625; G06Q 30/0631; G06Q 30/08; G06Q 10/06393; G06Q 10/087; G06Q 40/00; G06Q 40/04; G06Q 30/0252; G06Q 30/0257; G06F 17/30873; G06F 17/30566; G06F 17/30126; G06F 17/30613
USPC ................ 705/26.1, 27.1, 26.35, 26.41, 26.8, 705/26.5, 26.62, 14.1, 14.24, 343, 14.51, 705/14.55; 345/441; 707/E17.017, 707/E17.018, E17.109, 609, 622, 705, 763, 707/769
See application file for complete search history.

(56) References Cited

U.S. PATENT DOCUMENTS 5,870,741 A * 2/1999 Kawabe et al. ........................ 1/1
2001/0016860 A1* 8/2001 Nosohara ...................... 707/536

(Continued)

OTHER PUBLICATIONS

Adomavicius, G. and Tuzhilin, A. (1999): User profiling in personalised application through rule discovery and validation. 5th ACM SIGKDD International Conference on Knowledge Discovery and Data Mining. San Diego, California, ACM. 377-381. Aug. 1999.

(Continued)

*Primary Examiner* — Yogesh C Garg

(74) *Attorney, Agent, or Firm* — Fountainhead Law Group PC

(57) ABSTRACT

A hybrid context information matching approach may produce a customized product catalogue based on the user's context and the mobile device the user is using. A Knowledge Base (KB) and a KB manager, along with various processes perform specific collaborative tasks in order to achieve the overall goal of producing a customized product catalogue. In addition, the effort builds and/or updates the KB. Various contextual inputs are provided from both the user environment and data repositories. Hybrid matching is performed in order to determine optimal search results based on the contextual input provided.

9 Claims, 8 Drawing Sheets

(56) References Cited

U.S. PATENT DOCUMENTS

| | | | | |
|---|---|---|---|---|
| 2004/0181462 | A1* | 9/2004 | Bauer et al. | 705/26 |
| 2009/0307263 | A1* | 12/2009 | Skibiski et al. | 707/103 R |
| 2010/0262621 | A1* | 10/2010 | Ross et al. | 707/780 |
| 2011/0222471 | A1* | 9/2011 | Abraham et al. | 370/328 |
| 2012/0215639 | A1* | 8/2012 | Ramer et al. | 705/14.53 |
| 2012/0284131 | A1* | 11/2012 | Soffer et al. | 705/17 |

OTHER PUBLICATIONS

Adomavicius, G. and Tuzhilin, A. (2005): Personalised technologies: a process oriented perspective. Communications of the ACM 48 (10): 83-90. Oct. 2005.

Allan J., et al. (2003): Challenges in information retrieval and language modeling: report of a workshop held at the center for intelligent information retrieval, University of Massachusetts Amherst, Sep. 2002. SIGIR Forum 37 (1): 31-47.

Bohmer, M., Bauer, G. and Kruger, A. (2010), Exploring the design space of context-aware recommender systems that suggest mobile applications. Workshop on context aware and recommender systems, 2010 (CARS 2010). Barcelona, Spain. Sep. 26.

Callahan, E. and Koenemann, J. (2000): A comparative usability evaluation of user interfaces for online product catalogs Electronic Commerce '00 Minneapolis, Minnesota, ACM 197-207.

Church, K., Smyth, B., Bradley, K. and Cotter, P. (2008) A large scale study of European mobile search behaviour. Proceedings of the 10th international conference on Human computer interaction with mobile devices and services. Amsterdam, The Netherlands, ACM.

Coppola, P., et al., (2009): Context-aware browser. IEEE Intelligent Systems. Nov. 20, 2009.

Cosar, D, and Sleeman, D. (2007), KBS development through ontology mapping and ontology driven acquisition. Proceedings of the 4th international conference on Knowledge capture. Whistler, British Columbia, Canada, ACM: 23-30.

Hadzic, T. and O'Sullivan, B. (2008): Critique graphs for catalogue navigation. RecSYS'08. Laussane, Switzerland, ACM. 115-123. Oct. 23-25.

Lim, B. Y., Dey, A. K. and Avrahami, D. (2009): Why and why not explanations improve the intelligibility of context aware intelligent systems CHI 2009-Studying Intelligent Systems. Boston, MA, USA, ACM. 2119-2128. Apr. 4-9.

Lim, L. and Wang, M. (2005): Managing e-commerce catalogs in a DBMS with native XML support. 2005 IEEE International Conference on e-Business Engineering Beijing, China, IEEE. 1-8. Oct. 18-20.

Ricci F. and Nguyen, Q. N. (2005): Critique-based mobile recommender systems. Ogai Journal 24 (4).

Sohn, T., Li, K. A., Griswold, W. G and Hollan, J. D. (2008): A dairy study of mobile information needs. CHI 2008. Florence, Italy. 433-442. Jul. 5-10.

Sungrim, K. and Kwon, J. (2009): Information Retrieval using Context Information on the Web 2.0 Environment. International Journal of Computer Science and Network Security 9 (10): 62-64.

Tarasewich, P., Nickerson, R. C. and Warkentin, M. (2002): Issues in mobile e-commerce. Communications of the Association for Information Systems 8 (2002): 41-64.

Tsai, F. S., Etoh, M., Xie, X., Lee, W. and Yang, Q. (2010) Introduction to mobile information retrieval. IEEE: 11-15.

Tullio, J., Dey, A. K., Chalecki, J. and Fogarty, J. (2007): How it works: a field study of non-technical users interacting with an intelligent system. Computer/Human Interaction (CHI) 2007, Attention and Interruption. San Jose, CA, USA, ACM. Apr. 28-May 3.

Yi, J., Maghoul, F. and Pedersen, J. (2008). Deciphering mobile search patterns: a study of Yahoo! mobile search queries. Proceeding of the 17th international conference on World Wide Web. Beijing, China, ACM.

Bellavista, P., Corradi, A. and Montanari, R. (2006): A mobile computing middleware for location and context-aware Internet data services. ACM transactions on Internet technology 6 (4): 356-380. Nov. 2006.

Chalakov, N. ;2007): An approach for generating product catalogues in PDF format. International Conference on Computer Systems and Technologies—CompSysTech'07 Bulgaria, ACM. Jun. 14-15.

Barnard, L. Yi, J. S., Jacko, J. A. and Sears, A. (2007): Capturing the effects of context human perfomance in mobile computing systems. Personal and ubiquitous computing 2007 (11): 81-96.

Orjuela-Parra, J., Carrillo-Ramos A. and Martinez, M. (2009): Custom services platform for mobile commerce in nomadic environments: PIC-MMoMM2009. Kuala Lampur, Malaysia., ACM. Dec. 14-16.

Satish, S. and Pettay, O. (2006): Delivery context access for mobile browsing. International multi-conference on computing in global information technology (ICCGI'06). Bucharest, Romania, IEEE Computer Society. Aug. 1-3.

Maheswari, S. and Reddy, P. (2009): Discovering special product features for improving the process of product selection in e-commerce environment. ICE'09. Taipei, Taiwan, ACM. Aug. 12-15.

Chang, S. E. and Wang, C. (2010): Effectively generating and delivering personalised product information: adopting the web 2.0 approach. 24th International Conference on Advanced Information Networking and Applications Workshops, 401-406.

Ismail. M. H., Osmana, A. and Wahab, N. A. (2009): Evaluation of location-aware travel guide. 2009 International Conference on Computer Technology and Development. Kota Kinabalu, Malaysia 237-239, Nov. 13-15.

Bohmer, M. and Bauer, G. (2010): Exploiting the icon arrangement on mobile devices as information source for context-awareness. Mobile HCI 2010. Lisbon, Portugal, ACM. 195-198. Sep. 7-10.

Kim, J and Lee, F. (2005): A Study of user Xguery method for personalization recommendation in semantic web. Transaction on Engineering, Computing and Technology: 225-228.

Stafford, T. F. and Gillenson, M. L. (2003): Mobile commerce: what it is and what it could be Communications of the ACM 36 (12): 33-34.

Su, J., Yeh, H., Yu, P. S. and Tseng, V. S. (2010). Music recommendation using content and context information mining. Mobile Information Retrieval 25 (1): Jan. 16-26-Feb. 2010.

Stojanovic, N. (2004): On using query neighbourhood for better navigation through a product catalog: SMART approach. 2004 IEEE international conferenc on e-Technology, e-Commerce and e-Services (EEE '04). Taipei, Taiwan. Mar. 28-31.

Koukia, S., Rigou, M. and Sirmakessis, S. (2006): The role of context in m-commerce and the personalizaton dimension. IEEE/WIC/ACM International Conference on Web Intelligent Agent Technology Workshop 2006. Hong Kong. Dec. 18-22.

Kotsis, G. and Ibrahim, I. K. (2008): The web goes mobile: can we keep the pace? International Conference on Complex, Intelligent and Software Intensive Systems, IEEE. 240-246.

Church, K. and Smyth, B. (2008). Who, what, where & when: a new approach to mobile search. Proceedings of the 13th international conference on Intelligent user interfaces. Gran Canaria, Spain, ACM.

Zhang, Y. and Jiao, J. R. (2007): An associative classification-based recommendation system for personalisation in B2C e-commerce applications. Expert Systems with applications 33 (2007): 357-367.

Glissmann, S., Smolnik, S., Schierholz, R., Kolbe, L. and Brenner, W. (2005): Proposition of an m-business procedure model for the development of mobile user interfaces. International Conference on Mobile Business (ICMB'05). Sydney, Australia, IEEE Jul. 11-13.

Issel, K. and Mrozik, J. (2008): A mobile data framework and its business models MoMM 2008. Linz, Austria. 322-325. Nov. 24-26.

Jhangiani, I. and Smith-Jackson,, T. (2007): Comparison of moible phone user interface design preferences: perspectives from nationality and disability culture. Mobile Technology, Applications and Systems (Mobility 2007). Singapore. Sep. 10-12.

* cited by examiner

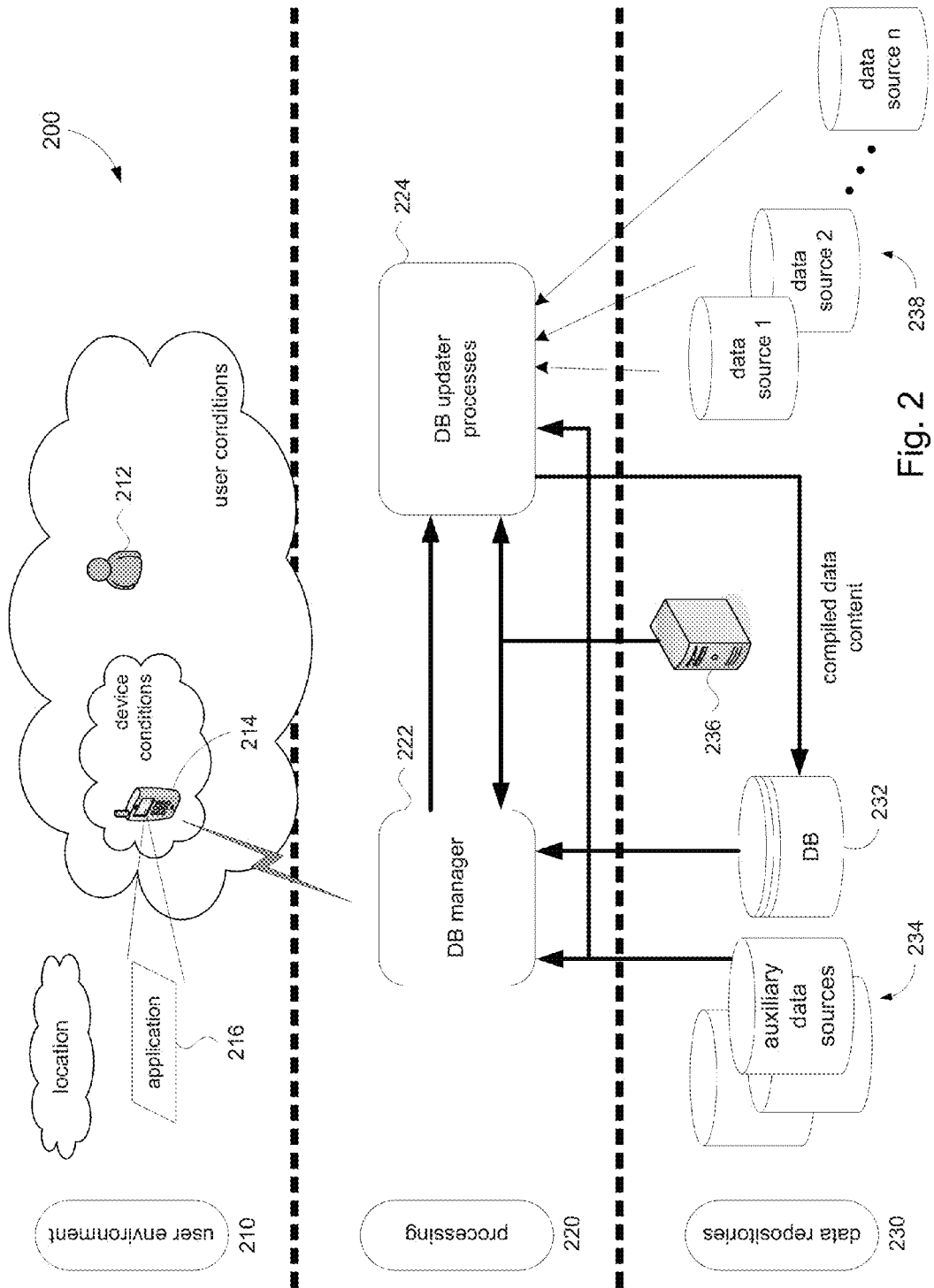

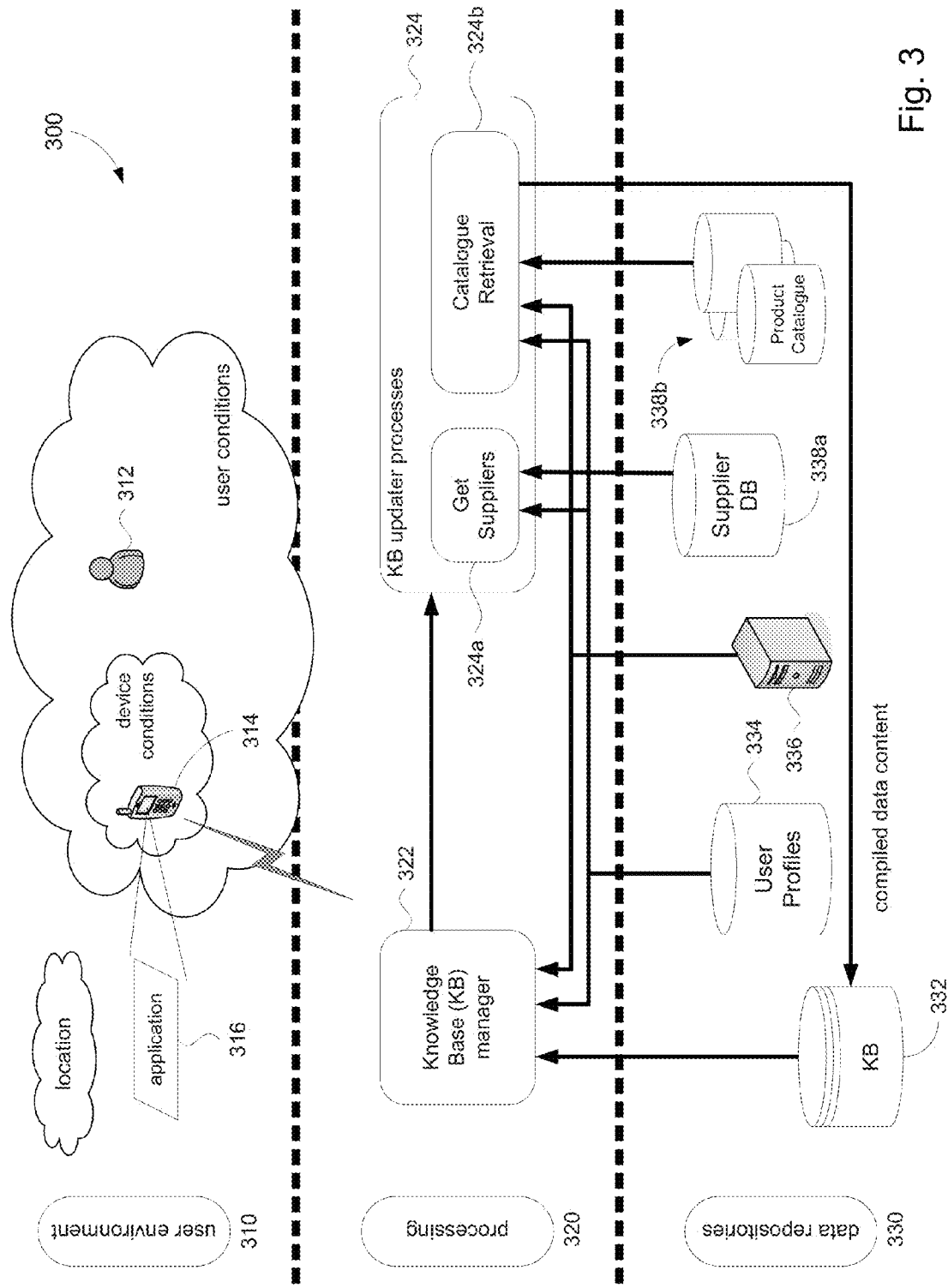

```
Input
    H_c: Concatenated context information (location,
        user preferences, mobile device profile,
        other context)
    KB: Knowledge Base (with relevant and up to date
        contents)
Output
    Decision:
        C_p: Personalised product catalogue [based on
            Historical data]
        Retrieval Procedure [call other processes]
Begin
    Get H_c
    Open KB
        Seek H_c in KB
            Exact match                                    [i]
                Retrieve C_p [use historical data]
                Update KB
            Else
                If partially match H_c
                    Update H_c
                    Go to [i]
            Else
                Perform default procedure
    Close KB
End
```

Fig. 5

```
Input
    S_L: File of available suppliers
    U_P: User preferences and context information, true
         [all conditions must hold]
Output
    S_P: File of preferred suppliers, [Ø at start]
Begin
    Open S_L
        Read S_L [current record]
        Test: S_L [current record] satisfy U_P
        If yes
            S_P [current record] = S_L [current record]
        Next
        Repeat until EOF S_L
    Close S_L
    Update KB
End
```

Fig. 6

```
Input

C_m: Merged product catalogue from various
         suppliers
    U_P: User preferences, true [all conditions must
         hold]
    D_P: Mobile device profile, to provide mobile phone
         capabilities
Output
    C_P: Personalised product catalogue, [Ø at start]
Begin
    Open C_m
        Read C_m [current record]
        Test: C_m [current record] satisfy U_P
        If yes
            C_P [current record] = C_m [current record]/D_P
                [Format record based on the device
                profile]
        Repeat until EOF C_m
    Close C_m
    Update KB
End
```

Fig.7

HYBRID CONTEXT-SENSITIVE MATCHING ALGORITHM FOR RETRIEVING PRODUCT CATALOGUE INFORMATION

BACKGROUND

The present invention relates to content delivery to a mobile device, and in particular to providing mobile commerce related content on a mobile device.

Unless otherwise indicated herein, the approaches described in this section are not prior art to the claims in this application and are not admitted to be prior art by inclusion in this section.

The proliferation of Internet-enabled mobile device usage has given rise to business to consumer (B2C) mobile commerce (m-commerce), and indications are that its popularity is to surpass that of B2C electronic commerce (e-commerce). Unlike in e-commerce, the m-commerce environment is very dynamic, for example, different mobile phones with different specifications are used in different locations.

In B2C m-commerce, businesses are able to provide customers with product catalogues on a mobile phone; customers can browse and purchase products using a mobile phone, anytime, anywhere. Conducting business transactions using a mobile phone is becoming very popular because of factors such as convenience, easy connection, ubiquity and cheaper costs of the hardware. Customers are now able to access e-commerce websites using a mobile phone to browse and purchase products. Efficient browsing of the product catalogue is, therefore, viewed as being an important consideration for success in B2C e-commerce and m-commerce, since customers make purchasing decisions based on the product catalogue contents. Accessing a product catalogue in m-commerce using a mobile phone is, however, difficult because there exist a number of physical properties inherent in a mobile phone that make browsing the product catalogue a tedious task for customers. Examples of such mobile phone properties include: low memory, limited processing power, small screen size, and limited user input modes such as small keyboard.

These constrained physical characteristics of mobile phones raise usability problems in an m-commerce environment. A challenge is therefore to provide an optimal way of retrieving and displaying a subset of product catalogue information on a mobile phone, taking into consideration the constraints and opportunities that exist in a mobile environment, without user intervention, or at most with minimal user intervention. Some conventional approaches for solving usability problems in e-commerce include:

- Recommender systems: Recommender systems are systems that perform intelligent information filtering and suggest products to online customers. These systems have been utilized in e-commerce to improve the online customers' experiences.
- Personalization: Personalization is defined as the use of technology and available customer information to tailor e-commerce interactions between a business and each individual customer. Personalization, in this case, can help to make products offered online more suited to the unique and individual needs of each user.
- Customization: Customization is a method that is used to remove the burden of information overload on the part of the user, especially the online user. In a customization process, end-users are given an opportunity to select their requirements from a set of comprehensive options and the businesses provide products and services based on users' explicitly selected requirements.

These and other issues are addressed by embodiments of the present invention, individually and collectively.

SUMMARY

A method of providing customized data content to a mobile device includes receiving information about the location of the user using a mobile device, along with contextual information comprising information about the current environment of a user of the mobile device and information about the mobile device's current operating conditions. A search key is generated, and comprises parameters that include the location information and at least some of the contextual information. The search key is used to search a database of data records. In embodiments, each data record comprises a compiled product catalogue.

If a data record is retrieved from the database, then the compiled product catalogue in the retrieved data record is sent to the mobile device. Conversely, if no data records are retrieved from the database, then a new data record is added to the database. In embodiments, adding a new data record includes obtaining one or more product entries from among one or more source product catalogues from among one or more suppliers, wherein the product entries, the source product catalogues, and the suppliers are identified based on the parameters of the search key. A newly compiled product catalogue is generated using the obtained information and stored in the database along with the search key.

In embodiments, if the search key is deemed to have a partial match with one of the keys, then the search key may be modified and another search is performed. Alternatively, a new data record may be stored in the database.

In embodiments, hybrid criteria of context information are used for product catalogue data retrieval to be displayed on a mobile device. The algorithm contextualizes and utilizes the mobile commerce environment and optimally retrieves product catalogue data for display on a mobile phone. Various contextual information (for example, location, user preferences and device profile) is collected as input which, together with the knowledge base (KB) contents, assist the algorithm's KB manager in making a decision to determine what processes have to be invoked in order to retrieve a customized product catalogue based on the users' current context.

The following detailed description and accompanying drawings provide a better understanding of the nature and advantages of the present invention.

BRIEF DESCRIPTION OF THE DRAWINGS

FIG. 2 illustrates a general architecture in accordance with principles of the present invention.

FIG. 3 illustrates the architecture of FIG. 2 in accordance with a specific embodiment.

FIGS. 5-7 are pseudo-code representations of portions of the flowchart of FIG. 4.

DETAILED DESCRIPTION

In the following description, for purposes of explanation, numerous examples and specific details are set forth in order to provide a thorough understanding of the present invention.

Embodiments in accordance with the present invention are generally directed to the retrieval of data content for delivery to a mobile device. In accordance with principles of the present invention, customized data content is compiled from various data sources where data is selected from the data sources and compiled based on criteria such as user characteristics, characteristics of the mobile device, and situational factors specific to the user's current environment and the mobile device's operating conditions. In order to illustrate various aspects of the present invention, disclosed embodiments will be directed to the compilation and retrieval of customized product catalogue information for delivery to a mobile device. It will be appreciated, however, to one skilled in the art, that the present invention can be applied in general to the effective delivery of "data content" (such as product catalogues) to mobile devices.

Figure 1:
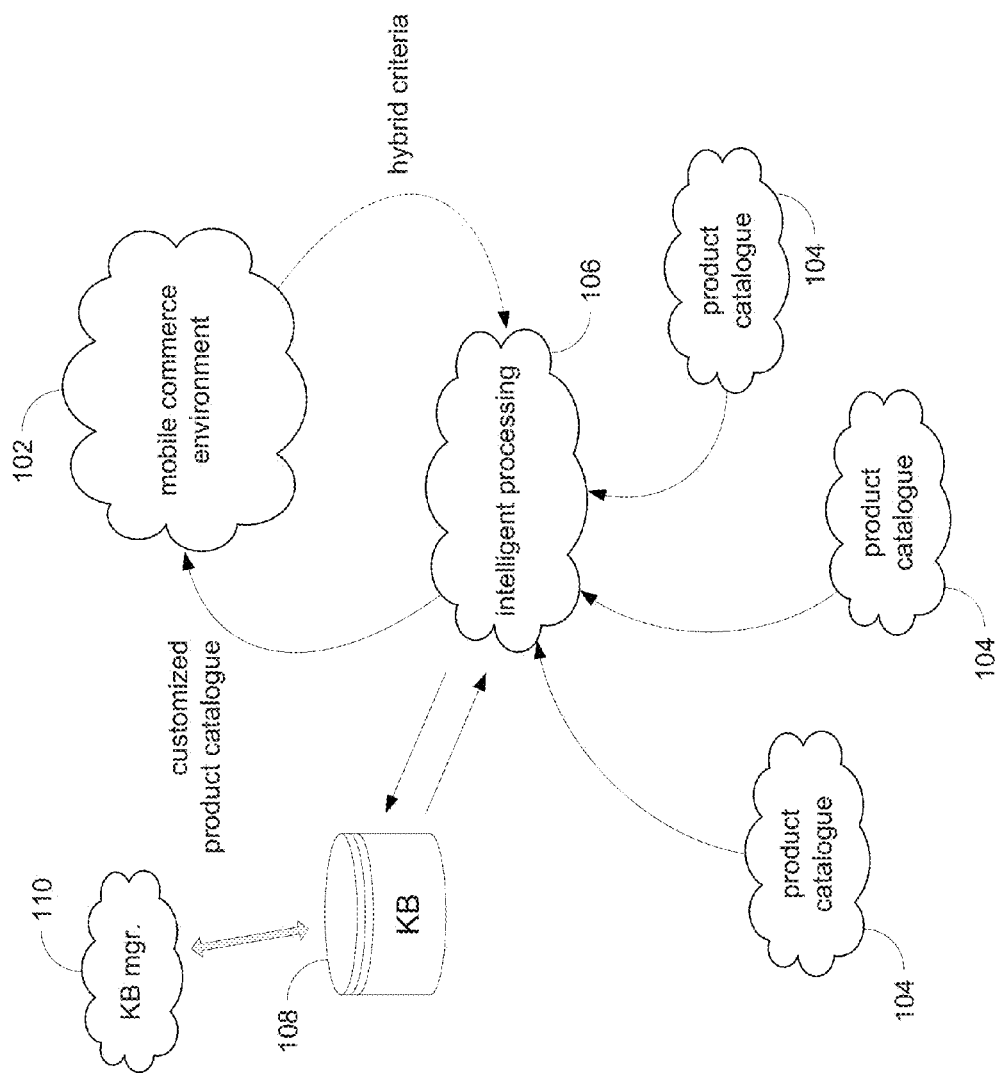
FIG. 1 represents a high level illustration of a particular embodiment of the present invention.

Referring to FIG. 1, an environment is described in which disclosed embodiments in accordance with principles of the present invention may operate. The description will consider aspects of a mobile environment 102, its opportunities and constraints; the nature of product catalogues 104 and the challenges in browsing a product catalogue on digital interfaces especially on a mobile device; and how intelligent processing 106 can be provided to optimize product catalogue information for effective delivery to a mobile device.

Mobile Commerce Environment

A mobile commerce environment 102 can be described as an environment in which business transactions take place using wireless networking access. A broad definition of m-commerce is the conduct of business transactions with a monetary value using mobile devices. Mobile devices include laptop computers. However, embodiments in accordance with the present invention may be more effective for Internet-enabled handheld mobile devices such as smart phones, personal data assistants (PDAs), and other small form factor devices where the displays do not readily lend themselves to displaying large amounts of data on a page, or where the mobile device has other limitations such as bandwidth, processor speed, memory capacity, and so on.

M-commerce is set to become a promising market because of the rapid increase in the use of Internet-enabled handheld mobile devices. With the increasing amount of information available on the virtual markets, it is difficult for online customers, especially m-commerce customers, to get what they are looking for without the assistance of intelligent systems such as recommender systems running in the background.

User Interface (UI) design and information presentation play a major role in mobile application acceptance. Optimal design of m-commerce applications is desirable as m-commerce users have little time to make decisions and devices are constrained in many ways. Optimization can be defined as act of coming up with the best, most favourable or desirable condition, especially under certain restrictions. In m-commerce, there are a number of restrictions and therefore optimization can be considered during design of m-commerce applications in terms of the following factors:

Memory use: Mobile phones have limited memory as compared to desktop computers, therefore a need to develop applications that optimize memory usage is desirable in m-commerce;

UI design (content and display): Due to the small and varying screen sizes, optimizing screen space during the design and run time of m-commerce applications is necessary;

User input: Mobile phones have limited user input modes, for example, small keyboard, and designing applications that take into consideration this limitation is desirable; and Network capability: Apart from limited capability to network connectivity, m-commerce applications, due to their mobility nature, suffer from network strength fluctuations. Therefore, during design, these factors have to be considered in order to optimize the delivery of m-commerce services.

The following subsections discuss components of a mobile environment. A mobile commerce environment is characterized by factors that differentiate it from its parent, the e-commerce environment. Examples of such characteristics include: convenience as a result of mobility (not localized and can be accessed anytime, anywhere), diversity and portability of devices (different devices used with different specifications), profile of users and context of use. The challenge in delivering mobile environment applications lies mainly in managing the dynamic nature of the mentioned components. The components can be automatically determined (implicitly) or explicitly disclosed by the user. The following discuss the mentioned components or characteristics of a m-commerce environment.

A. Customer Profile

A customer profile is a collection of information that describes the customer. A mobile customer profile can include two sets of information, static (or factual) and dynamic (or behavioral). Static information includes:

Basic information, for example, name, date of birth, and gender.

Dynamic information includes:

Preferences, for example, a particular brand of products;

Interests, for example, products with particular features; and

Purchasing and browsing history, for example the previous three purchases.

B. Mobile Device Profile

A mobile device profile can be defined as a description of the characteristics of a particular mobile device being utilized by a specific user. Content and presentation adaption has to be designed and implemented to fit within the current device's capabilities that can be provided by a profile. The mobile device profile can be defined by parameters that fall into two groups: hardware and software. These parameters are basically static (i.e. they do not change during the course of interaction) and have influence on both retrieval and presentation of information on the mobile phone. An analysis of mobile phone device properties indicates that they all have an influence on both the retrieval and presentation of product catalogue data. Table I below shows an example of these parameters, their behavior and influence on information retrieval (IR) and rendering. In some embodiments, the mobile device profile information may be obtained from the Wireless Universal Resource File (WURFL) (e.g., see FIG. 2).

TABLE I

| mobile device features | | | | |
|---|---|---|---|---|
| Phone Feature | Class | Behavior | Influence on IR | Influence on rendering |
| Memory | Hardware | Static | ☐✓☐ | ☐✓☐ |
| Screen size | Hardware | Static | ☐✓☐ | ☐✓☐ |
| Resolution | Hardware | Static | ☐✓☐ | ☐✓☐ |
| Processor | Hardware | Static | ☐✓☐ | ☐✓☐ |

TABLE I-continued mobile device features

| Phone Feature | Class | Behavior | Influence on IR | Influence on rendering |
|---|---|---|---|---|
| User input mode | Hardware | Static | ☐✓☐ | ☐✓☐ |
| Operating system | Software | Static | ☐✓☐ | ☐✓☐ |
| Installed software | Software | Static | ☐✓☐ | ☐✓☐ |

C. Location

A distinguishing feature for mobile applications is their ability to provide flexibility in terms of access location, generally termed as mobility. Unlike other localized applications, mobile applications can be accessed at different places and the provision of services that suit a particular location is crucial for mobile applications user acceptance. Location in mobile applications can be determined implicitly or explicitly.

Mobility is generally categorized into three types:
Wandering: Movement within a place;
Travelling: Movement between places; and
Visiting: The act of being in one place for some time and then moving to another.

Mobile application designers have to consider all three mobility aspects, especially wandering and travelling, as visiting is static for a specific period of time. In accordance with aspects of the present invention, location may be utilized to determine a specific position from which the user is accessing the application in order for the system to suggest the closest suppliers available.

D. Other Context

In a mobile environment, users access applications in different places with different other factors surrounding them, for example, varying bandwidth, connection costs, light levels, device screen orientation (e.g., landscape vs. portrait), and other factors. Such environmental factors pose a great challenge in developing mobile applications that suit the ever-changing context that is naturally embedded in mobility. Context information can also be determined implicitly or explicitly. An example of such context information includes aspects such as the weather at that particular point in time when the user is accessing the application and surrounding.

In accordance with principles of the present invention, "hybrid criteria" of context information may be defined to include at least the following information:

Location: This may be determined by the signal source or by the global positioning system (GPS);
User profile: This may include user preferences in terms of suppliers and products;
Mobile device profile: This may include particular mobile device characteristics; and
Other contextual information: This may include other factors that exist within the application's operating environment. Although location, user preferences and device profile may form part of the wider definition of context, they have been specified as separate factors in the hybrid criteria. Accordingly, contextual information may include any other factors not related to location, user preferences or device profile. That is, contextual information may be regarded as a set of dynamic factors (other than location, user preferences and device profile) available in the user environment that may influence the process of retrieving information. Examples of such dynamic factors include lighting conditions (e.g., indoor, outdoor, sunny, cloudy, etc), noise levels (e.g., crowds, alone, etc), as well as social situation, and so on.

Dynamic factors relating to operating conditions of the mobile may form part of the contextual information. Such factors include, but are not limited to: current time, bandwidth, communication costs, battery life of the device, and other operating conditions of the mobile device.

Product Catalogue

Continuing with FIG. 1, a product catalogue 104 may be defined as a large dataset of items that a business offers on the market. Each item in a product catalogue has attributes that describe the item's characteristics. For example, an item such as a television can have the following as a set of attributes in a product catalogue:

Technical information, for example, brand, screen size, signal type;
Selling information, for example, price, delivery method, availability; and
Other information, for example, seller's contacts, manufacturer.

Depending on the type of products, either textual or graphical or both item description styles can be used to describe a product.

There are two main types of a product catalogue: manual or paper-based and electronic catalogues. Manual catalogues are normally presented on paper, brochures and magazines. The products are commonly described using text as well as images. Electronic catalogues are used in e-commerce (and recently in m-commerce) to display product information on digital interfaces such as computers and mobile phones.

As noted above, several end-user usability problems exist when browsing an electronic product catalogue in m-commerce such as:

Limited space on digital interfaces to present many items;
Product selection and decision making is problematic as there are many choices represented on small screens for customers to process; and
Presenting recommendations on a mobile phone is challenging because of the limitations of the mobile device itself and the difficulty in eliciting user preferences.

Embodiments in accordance with principles of the present invention may ensure that the product catalogue data retrieved by aggregating various dynamically obtained contextual information and other constraints (such as location and mobile device capabilities) contributes effectively to solving usability problems with regard to product catalogue browsing on a mobile phone. For example, based on the user's purchasing history, only a small subset of the whole catalogue can be retrieved, hence lowering the product information rendering and selection challenge on a small screen.

Intelligent Processing

Intelligent processing 106 falls under the branch of computer science known as Artificial Intelligence (AI), and may comprise systems that are able to utilize built-in rules, implicitly learn the user activities and the environment in which they operate, and, based on these, take necessary actions when invoked. For example, an intelligent system can be able to take over some tasks from the user in order to achieve the user's goals efficiently and effectively.

In accordance with aspects of the present invention, intelligence processing 106 may be utilized to contextualize the mobile environment 102 during the retrieval of product catalogue data 104 for display on a mobile device. In some embodiments, intelligence processing may be provided by both a knowledge base (KB) 108 that stores the rules representing knowledge and a KB manager 110 that manipulates and derives meaning from the knowledge in the KB 108 in order to make decisions.

The discussion will now turn to intelligent retrieval of information in accordance with principles of the present invention, including how context may be utilized to perform intelligent retrieval of information.

A. Contextual Information Retrieval

Due to the abundance of information available both on the web and native applications, it is not easy for users to find information that fulfills their specific needs and preferences. Information retrieval (IR) deals with the structure, analysis, organization, storage, searching, and retrieval of information. Different techniques of information filtering are based on the following steps of IR:

Representation of the content of the documents or data source: This is sometimes called indexing, cataloguing or simply the creation of a data source;

Representation of the user's information need: This is also called query formulation in which the user is allowed to present what type of information is to be retrieved from the data source; and Comparison of the above two representations: This is the final step in which the contents of the data source are matched with the users' query to retrieve the information the user is looking for.

Contextual information retrieval is a technique that combines search techniques, the user query and knowledge of the current user context into a single framework to perform IR in order to provide the most appropriate answer for a user's information needs. There are a number of ways in which contextual information can be applied when conducting the search operation, for example, sequential, random, ranking, fuzzy logic and probabilistic. The greatest challenges in contextual retrieval are noise or inaccurate contextual information and difficulty in eliciting contextual information. Examples of information retrieval approaches that use contextual information include:

Location-aware search: This is an approach that is gaining popularity in which location information is used to provide services or search results that are within the vicinity of the user. It is being widely used in developing tourism applications;

Contextual content delivery: This is an approach that is used to deliver content on web and mobile applications based on the context, for example, capabilities of a mobile phone, such as hardware and software specifications;

Context-aware web search: This approach is used to search information on the web using contextual information. Most research conducted in the area of web IR has been focusing on the general web other than mobile web; and Mobile information retrieval: This approach can be defined as the indexing and retrieval of information such as text, images, animation, sound, speech video and other types for the sole purpose of presenting it on a mobile device. This is a subset of traditional IR that is recently attracting more attention and is becoming important due to the ever-increasing usage of mobile devices. In accordance with aspects of the present invention, embodiments may utilize two core elements to perform optimal retrieval of product catalogue data specific for the display on a user's specific mobile phone, namely: hybrid criteria of context information as input and the use of the KB and a KB manager. These aspects of the present invention will be discussed below.

Three basic techniques used to perform IR are:

Boolean Search: A Boolean search strategy retrieves items from a data source which match TRUE for the query. The basic query for the Boolean search consists of keywords and logical connectives such as AND, OR, and NOT;

Vector Space Model Search (VSM): This is one of the widely used IR models. The model creates a space in which both documents and queries are represented as vectors. In the vector space model, text is represented by a vector of terms. Any text can be represented by a vector in this high dimensional space. If a term belongs to a text, it gets a non-zero value in the text-vector along the dimension corresponding to the term. During a retrieval operation, documents are ranked according to the similarity between the document vector and the query vector, and those with the highest similarity are returned; and Probabilistic Model Search: This family of IR models is based on the general principle that documents or items in a collection should be ranked by decreasing probability of their relevance to a query. Probabilistic IR models estimate the probability of relevance of documents for a query.

Usually users or customers are not aware of how they can present their preferences for a product catalogue search and therefore they are required to undergo a number of steps to refine the initial queries. This brings about a need to assist users in finding a particular piece of information that suits their needs by utilizing the capabilities of intelligent systems especially in m-commerce, which is already hampered with a number of limitations. Accordingly, in some embodiments, the user's input may be determined implicitly using preferences and context information (hybrid criteria). However, in other embodiments, an option may be provided for users to explicitly enter a search keyword in those situations where the user may need to facilitate the search.

B. Information Presentation on a Mobile UI

Typically, personalization and customization of user interfaces (UIs) is based only on user profiles to present an interface that suits a particular user's profile. This works in e-commerce because most desktop computers have almost similar physical characteristics and standard specifications; for example, screen sizes and user input mode. However, the challenge in m-commerce is that, apart from customers having different profiles, mobile phones come in various types and shapes with no standard specification. For example, some mobile phones have touch screen interfaces and slightly bigger screen sizes than others. As such, a one-size-fits-all approach for information presentation used in e-commerce has not been effective in m-commerce. Accordingly, it is important to consider how information can be presented on a mobile phone, taking into consideration a specific mobile phone's constraints as well as the user's profile.

As noted above, embodiments of the present invention may be directed to the retrieval of data content in general. A specific example of customized product catalogues serves as an illustrative example. Accordingly, a discussion of the general case of data content retrieval is discussed first. This is followed by a discussion of the specific example of customized product catalogues.

Referring to FIG. 2, an operating architecture 200 in accordance with aspects of the present invention to retrieve data content will be described. In embodiments, the architecture 200 may be partitioned into three segments: a user environment 210, a processing segment 220, and data repositories 230. The user environment 210 includes the physical location of a user 212 of a mobile device 214, the user conditions in which the mobile device is being operated, and the operating conditions of the mobile device itself. The user environment 210 serves to trigger data content retrieval processing in accordance with embodiments of the present invention. For example, the user 212 may access a mobile application 216 installed on the mobile device 214 which triggers activity in the processing segment 220. The mobile application 216 may comprise program code that can be executed by the mobile device 214 to operate the mobile device in accordance with aspects of the present invention.

In embodiments, the mobile device 214 may be an Internet-enabled device such as a smart phone or a personal data assistant (PDA). The mobile device 214 may be a computer tablet, such as Apple's iPad® tablet. As explained above, the physical constraints of smaller form factor mobile devices pose challenges for information retrieval and processing that may not be found in mobile devices that have a larger form factor such as a computer tablet. Nonetheless, it will be appreciated that embodiments of the present invention may be used in any mobile device.

In accordance with principles of the present invention, aspects of the mobile device 214 itself may serve as a source of input into the processing segment 220 of the architecture 200. For example, the device type of the mobile device 214 may be an input. The device type identifies the manufacturer and the particular model of the mobile device 214, and as will be explained below, this information may then be used to access the specifications of the mobile device such as the features, functions, hardware configuration, and so on.

Further in accordance with principles of the present invention, aspects of the user environment 210 itself may serve as another source of input into the processing segment 220. For example, the location of the user 212 may be an input. The physical conditions of the user's surrounding in which the mobile device 214 is being operated may be a source of inputs. The operating conditions of the mobile device may yet be another source of inputs to the processing segment 220. The user's conditions and the mobile device's conditions are collectively represented by information referred to herein as context (or state) information. As the name indicates, context information refers to the specific conditions under which the user 212 and the mobile device 214 are operating, and are typically characterized as being dynamic. For example, the lighting conditions in a location may be sunny and bright one day, and the same location may be cloudy the next day.

In accordance with aspects of the present invention, the context information may include any information about the conditions of the user's 212 surrounding environment that may influence the retrieval of data content by the processing segment 220. For example, the retrieval of data content may take into account user conditions such as time of day, lighting (e.g., brightness level), temperature, sound level, and so on. Operating conditions of the mobile device 214 include information such as signal strength, bandwidth, battery level, communication costs, and so on may also affect the specific data content that is retrieved.

The processing segment 220 may include a computer system configured as a database system comprising a database 232 and a database manager 222. In accordance with aspects of the present invention, the database 232 may include compilations of data content obtained from various data sources 238. The database manager 222 receives contextual information from the mobile device 214 (more specifically from an application, such as mobile application 216, executing on the mobile device), and may use the contextual information to access the compilations of data content from the database 232. The database manager 222 may obtain auxiliary information from various data sources 234 which may influence the data that is accessed from the database 232. A device type data source 236 may provide specifications for the mobile device 214, which can further influence the retrieval of data from the database 232.

The processing segment 220 may include a database updater 224, which may comprise a collection of cooperating processes to generate new compilations of data content to be stored in the database 232. The database manager 222 invokes the database updater 224, providing as input the context information received from the mobile device 212 and any additional information that may be obtained from data sources 234 and 236. As will be explained below, the selection and compilation of data obtained from data sources 238 made by the database updater 224 is guided by the inputs from the database manager 222.

The data repository 230 comprises the database 232 and any auxiliary data sources 234 that may guide the database manager's 222 accessing of data in the database. For example, an auxiliary data source may be a database of user profile information for users in the architecture 200. The database manager 222 may create user profiles for new users, and may update profiles of existing users. The device type data source 236 provides specifications on mobile devices. For example, the Wireless Universal Resource File (WURFL) is a device description repository which contains the descriptions of thousands of mobile devices. The compiled data content that is stored in the database 232 is compiled from data contained in data sources 238. The specific data stored in the data sources 238 will vary from one particular embodiment of the present invention to the next. A specific example is given below, where the data sources comprise product catalogue data from different suppliers of goods and services.

Figure 2A:
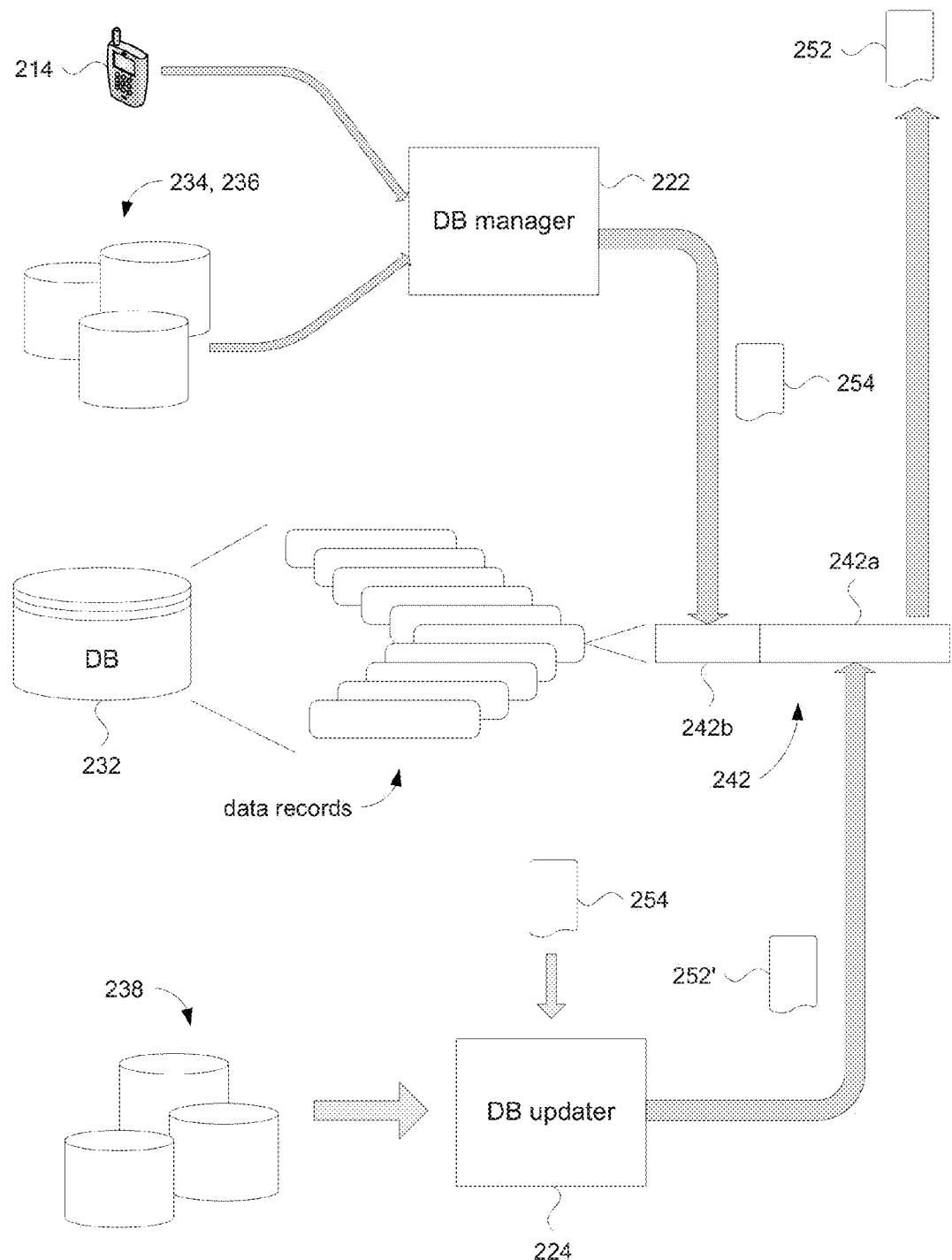
FIG. 2A depicts a logical data architecture of a database.

FIG. 2A illustrates a logical organization of the data architecture of the database 232. The logical organization serves only to facilitate making reference to different parts of the database 232. One of ordinary skill in the relevant arts will appreciate that the logical organization shown in FIG. 2A can be implemented using any of a number of known database architectures. As noted above, the database 232 is accessed by the database manager 222 to retrieve compiled data content comprising data previously retrieved from data sources 238 (e.g., by the database updater 224). Accordingly, in embodiments, the database 232 stores a unit of compiled data content 252 as a data record in the database. The database 232, therefore comprises a plurality of data records 242, where each data record 242 includes a data component 242a and a database (DB) key 242b. The data component 242a comprises the unit of compiled data content 252 that is the target of a retrieval operation. The DB key 242b is associated with the data record 242, and is used to access the data record. In accordance with principles of the present invention, the DB key 242b comprises a search key 254 that is generated, computed, or otherwise derived from contextual information received from the mobile device 214, along with any auxiliary data such as might be obtained from data sources 234 and 236. As indicated in FIG. 2A, the search key 254 is also used by the database updater 224 in the production of a new compilation of data content 252'. These aspects of the present invention will be discussed in more detail below.

Referring to FIG. 3, a particular embodiment of the architecture 200 of FIG. 2 directed to providing customized product catalogues to a mobile device may be instructive to illustrate aspects of the architecture. The user environment 310 is similar to the user environment 210, and includes the physical location of a user 312 of a mobile device 314, the user conditions in which the mobile device is being operated, and the operating conditions of the mobile device itself. The user 312 may access a mobile application 316 installed on the mobile device 314 to trigger the processing segment 320. For example, the mobile application 316 may be an m-commerce application that receives and presents customized product catalogues to the user 312.

In embodiments, the processing segment 320 may include a knowledge base system comprising a knowledge base 332 and a knowledge base (KB) manager 322, as a specific example of the database arrangement shown in FIG. 2. The knowledge base 332 includes previously compiled customized product catalogues for retrieval by the KB manager 322. The KB manager 322 receives contextual information from the mobile device 314, and may use the contextual information to access a customized product catalogue from the knowledge base 332. The KB manager 222 may use auxiliary information such as user profile information (e.g., from a user profiles database 334) about the user in order to determine which customized product catalogue to retrieve. A device type data source 336 may provide specifications for the mobile device 314, which can further influence the retrieval of data from the knowledge base 332.

The processing segment 320 may include a KB updater 324, which may comprise a collection of cooperating processes to generate new compilations of customized product catalogues to be stored in the knowledge base 332. As will be explained below, the KB manager 322 can decide whether update processing needs to be invoked during the retrieval process or whether items can be inferred from the user's purchasing history. The KB manager 322 makes decisions by utilizing input from the user environment and the knowledge contained in the knowledge base 332. The processes take in various contextual input, as instructed by the KB manager 322, from both the user environment and the data repositories 330.

The data repository 330 comprises the knowledge base 332. It will be appreciated that the logical organization of the knowledge base 332 may be represented by the data architecture illustrated in FIG. 2A.

The data repository 330 further comprises various other data sources. For example, the user profiles database 334 provides information about the user 312. User profile information is sometimes referred to a customer profile information. The device type data source 336 provides specifications on mobile devices. For example, the Wireless Universal Resource File (WURFL) is a device description repository which contains the descriptions of thousands of mobile devices. A device description determines the capability of a particular mobile device (e.g., mobile phone) in handling and presenting the product catalogue on a particular mobile device. A data source 338 that may feed into the KB updater 324 includes a Supplier database 338a which contains information about suppliers of goods and/or services, for example, location, description contact details, and so on. Another data source 338 that may feed into the KB updater 324 includes a Product catalogue database 338b which contains information about products a supplier is offering on the market. Each supplier may maintain their own product catalogue. The Product catalogue database 338b may represent access to each supplier's database, or may represent a compilation of all the catalogues from the various suppliers, or may be some combination of the two representations. It will be appreciated that the databases illustrated in FIG. 3 are logical representations of databases rather physical instances.

In embodiments, the Knowledge base (KB) systems comprise artificial intelligence (AI) tools working in a particular domain to provide intelligent (human-like) decision making support with justification based on stored knowledge. There are typically three main components of a KB system:

Acquisition mechanism: This component is responsible for the accumulation of domain knowledge, automatically or through domain experts based on experience;

Knowledge repository: This component stores the domain knowledge to be used in future for decision making; and Inference engine: This component makes decisions by matching the current situation with the domain knowledge contained in the KB. The inference engine can further include heuristics and probabilities to facilitate the decision making process.

In accordance with embodiments, the knowledge base 332 provides knowledge pertaining to the user's purchasing history to the KB manager 322. Using a concatenation of current context information ($H_c$, discussed below) as input, the KB manager 322 utilizes built-in reasoning to make decisions on what procedure to follow to optimally retrieve a customized product catalogue.

As will be explained in more detail, depending on the current context, the KB manager 322 makes a decision on what parameters can be utilized to form part of $H_c$ to be used as input for matching. The initial parameters can be updated, replaced or removed to form a new $H_c$. For example, if the device profile cannot be determined for the mobile device 314, the KB manager 322 can decide to provide a default mobile device profile for that particular customer. Furthermore, the KB manager 322 can decide what processes can be skipped during the retrieval process in order to optimize the performance of the algorithm. The KB manager 322 relies on the knowledge contained in the knowledge base 332 and the current context information to make decisions.

The KB manager 322 may utilize a number of techniques to update the knowledge base 332. For example, the following techniques could be used to update and manage the knowledge base 332:

First in first out (FIFO): This technique takes out the first entries that got into the KB to create space for new knowledge when the threshold is reached;

Least frequently used (LFU): This techniques is used to remove entries that have not been used frequently; and Push mechanism: This technique adds new knowledge into the KB.

Figure 4:
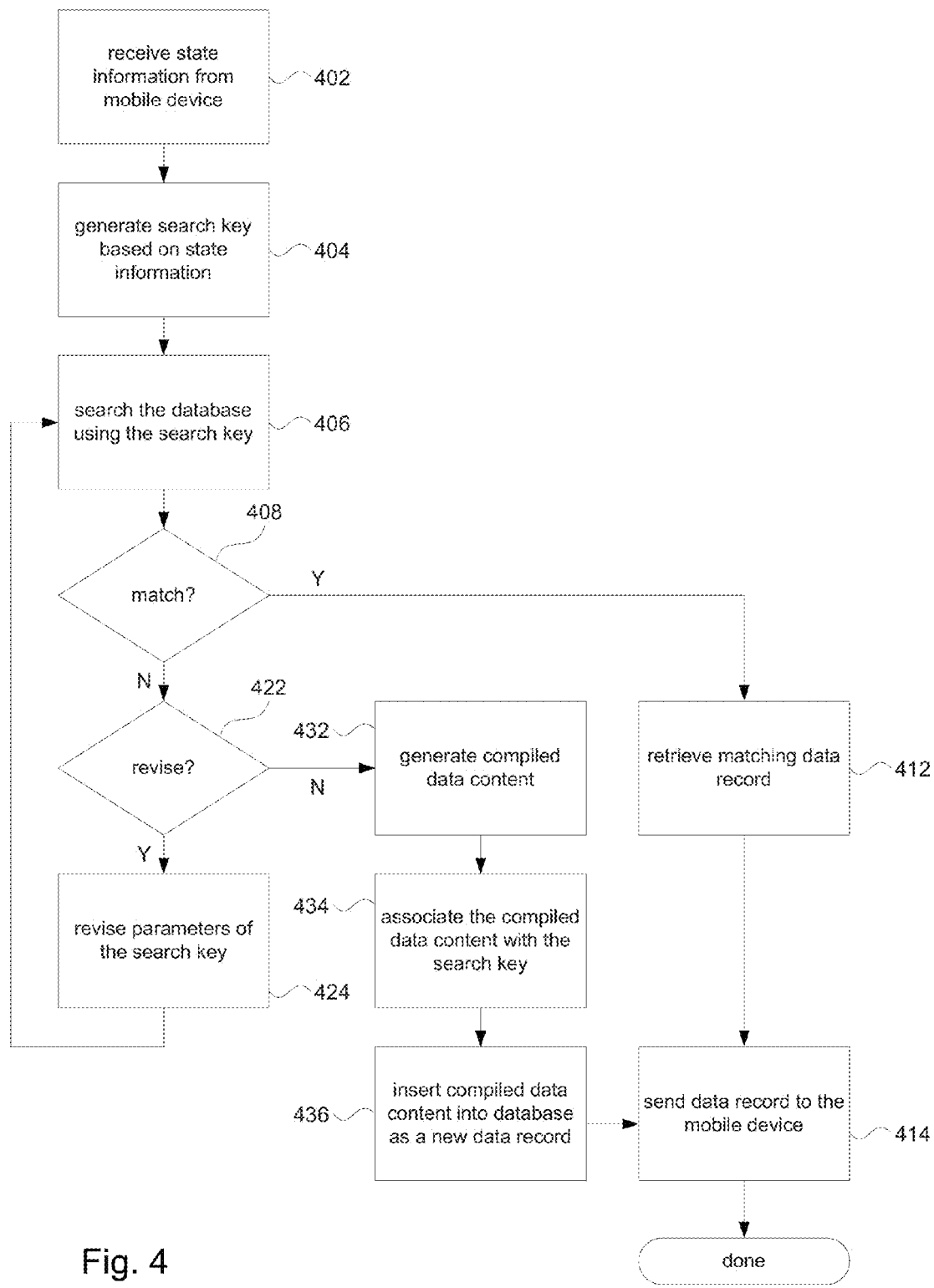
FIG. 4 is flowchart of processing in accordance with aspects of the present invention.

FIG. 4 illustrates processing that occurs in the general architecture 200 shown in FIG. 2, and in the architecture 300 for the specific illustrative example shown in FIG. 3. The process will be described with reference to the general architecture 200 of FIG. 2 with the understanding that the process applies to corresponding components in the architecture 300 of FIG. 3. Specific references may be made to the architecture 300 as needed in order to emphasize detail specific to the customized product catalogues.

Thus, in a step 402, state information is received from the mobile device 214. The state information, for example, may be the context information introduced above and discussed in more detail below. This step may be initiated by the user 214 launching a suitable mobile application 216. For example, in the customized product catalogue example of FIG. 3, the m-commerce application 316 may be launched by the user 312 in order to browse, purchase, or otherwise view products in a specific location using their mobile device 314.

In a step 404, a search key (e.g., 254, FIG. 2A) is generated by the DB manager 222 based on the context information. Consider, for example, search keys specific to the customized product catalogue example shown in FIG. 3. In embodiments, hybrid criteria $H_c$ generated by the KB manager 322 may constitute the search key. Referring for a moment to FIG. 2A, the DB key 242b portion of the data record 242 may comprise hybrid context information that can be used as keying information for the retrieval of a customized product catalogue. In an embodiment, the DB key 242b comprises hybrid criteria ($H_c$) obtained by the concatenation of identified contextual information. The following defines the parameters of the concatenated contextual information arranged in order of priority, from high to low:

$H_c$=[location (L), user preferences (U), context (C), device profile (D)].

In embodiments, the $H_c$ parameters may be processed in logical sequence in accordance with their priority as follows to accomplish various tasks. For example, location, user preferences and context may be used to determine the list of preferred suppliers available within a predefined location;

user preferences and other context may be used to determine frequently purchased products by the user. These products are the ones of which catalogue data has to be retrieved; and the mobile device profile may be used to determine the mobile phone capabilities and what product information supported by the phone capabilities has to be retrieved.

Table II summarizes where each parameter of $H_c$ is used during the retrieval process.

TABLE II $H_c$ usage

| | Location | User preferences | Context | Device profile |
|---|---|---|---|---|
| Suppliers | ☑ | ☑ | ☑ | |
| Products | | ☑ | ☑ | |
| Product Catalogue data | ☑ | ☑ | ☑ | ☑ |

Continuing with FIG. 4, in a step 406, the database 232 is searched using the search key. For example, the search key may be matched against the DB key 242b (FIG. 2A). If a match is found in a step 408, then in a step 412 the data record (e.g., 242a) associated with the matching key is retrieved and sent to the mobile device in a step 414. In the product catalogue example shown in FIG. 3, the data record comprises a previously compiled customized product catalogue. As can be appreciated, the retrieved product catalogue is "customized" in that the conditions of the user's environment were incorporated into the search key that was used to retrieve the customized product catalogue.

If, in step 408, a match was not found, then in a step 422a decision is made whether to modify the search key and repeat the search, or to update the database 232. The criteria for making a decision to modify the key may be based on the search key $H_c$. For example, a match may be deemed to occur if and only if an exact key $H_c$ exists in the KB. In embodiments, the algorithm may accommodate partial match when an exact match cannot be found. If the search key is deemed to partially match a key in the database, then modification of the search key may be performed. A partial match may consist of a partial combination or composition of $H_c$. For example, a partial match may result if some parameters in $H_c$ have no values; i.e., for any L, U, C or D=Ø. Examples of $H_c$ with a partial match can be:

$H_c$=L+U+C+Ø, where D=Ø, $H_c$=Ø+U+C+D, i.e. L=Ø, etc.

Accordingly, in a step 424, the search key may be modified, for example, by adjusting parameter values. To illustrate, suppose the user preference (U), device profile (D), and context (C) match a certain key but the location is different. This may be deemed to be a partial match situation. In this case, the key may be adjusted in order to retrieve only data that matches U, D, and C where L is considered to be Ø. The search may then be repeated from step 406 with the modified search key.

If, on the other hand, the search key is deemed not to match any keys in the database, then an update of the database 232 may be performed. Accordingly, processing proceeds to a step 432. The forgoing disclosed steps may be referred to as "class one processes" and are summarized in the pseudo-code representation shown in FIG. 5.

Continuing with FIG. 4, in step 432, new data content is compiled. With respect to the general architecture of FIG. 2, the compiled data content is derived from various data sources 238. In addition, the compilation of the new data content may be influenced, directed or otherwise controlled with information from other sources of data 234, 236. Referring now to the more specific example of customized product catalogues shown in FIG. 3, step 432 includes two parts: (i) getting a list of suppliers and (ii) retrieving the product catalogue data that comprises the customized product catalogue.

In the first part of step 432, getting a list of suppliers includes taking contextual input from both the user environment and data repositories 330 and retrieving a list of suppliers from which a customer can purchase products. This set of processes uses the following input to achieve the mentioned goal. This set of processes may be referred to as "class two processes" and is summarized in FIG. 6:

Non-empty location identifier (GPS coordinate or signal source), obtained from the mobile device 314 in the user environment.

User preferences, obtained from the User Profiles 334 in the data repositories 330. A user identifier may be communicated from the mobile device 314. For example, the m-commerce application 316 may obtain an identifier of the user 312.

Supplier information, obtained from the supplier database in the data repositories.

A process for getting the suppliers list may proceed as follows:

Get signal/GPS coordinate of the current user location using input. This can be a GPS coordinate or a source of the signal.

Determine the zone where the GPS coordinate or the signal is originating from.

Get all suppliers that are available in the determined zone using input (e.g., from Supplier DB 338a).

Narrow the list of suppliers with user preferences (e.g., obtained from User Profiles 334). This may include selecting suppliers that the user is registered with and accessing from those suppliers the user profiles for the user.

Upon completion, the output is a list of suppliers from which the customer can purchase products. This list may be deemed to be optimal in terms of the current user location, user preferences and context. Previous purchasing history will be incorporated once the KB reaches maturity.

In the second part of step 432, retrieving the product catalogue data utilizes the results obtained in the first part of step 432 and searches the product catalogues of the listed suppliers for specific products that the user will be interested in. This search process is based on current context information. This set of processes uses the following input to achieve the mentioned goal. This set of processes may be referred to as "class three processes" and is summarized in FIG. 7:

List of available suppliers.

User preferences, obtained from the User Profiles 334 in the data repositories 330.

Device profile, obtained from the WURFL 336 in the data repositories 330.

Merged product catalogue data from various suppliers, obtained from Product catalogue database 338b in the data repositories 330.

A process for retrieving the product catalogue information may proceed as follows:

Get list of preferred suppliers.

Narrow the product catalogue data and contents based on the user preferences (from User Profiles 334) and mobile device profile obtained from WURFL 336. This process may involve the utilization of the user preferences to create a list of products to be retrieved for a particular user.

In embodiments, the retrieved information may be sorted based on the user's preferences along with priorities that may be assigned by the user to the different preferences. These preferences may be stored as part of the user profile in the User Profiles 334 data store. A weighted approach may be used to sort, based on the user preferences. In an embodiment, the sorting may be based on the priority assigned by a particular user to the individual characteristics of a product (e.g. price, warrantee period) and supplier (e.g. location/distance). For example, one user may consider price of a product to be of more importance than the distance to the supplier where the product is available. Hence, the records of the customized catalogue would be sorted first on price (low→high), then on distance to supplier. Other users, for example, may want to buy products from the nearest location, and price is only of secondary importance. In that case, the records would first be sorted on distance, then on price.

The process may utilize the mobile device profile to determine the capabilities of the particular mobile device 314 that the user 312 is using. The determined mobile device capabilities facilitate knowing in advance what product information the mobile device 314 will be capable to display. In addition, the information helps to format the retrieved information in preparation for display on a particular mobile device. Examples of specific techniques that can be utilized to format the information for display on a mobile device:

Automatic summarization;

Content and keyword fusion; and

Content-based extraction and indexing.

A customized product catalogue data is generated. This information is now ready for subsequent processing; e.g., by a presentation algorithm (not shown) for display on the mobile device.

After the data content (e.g., customized product catalogue) has been compiled in step 432, the compiled data content can then be added to the database 232. In a step 434, the search key generated in step 406 may be associated with compiled data content, and in a step 436, the pair may be inserted into the database 232. Steps 434 and 436 may be performed as a single database operation. In the customized product catalogue example of FIG. 3, for example, the hybrid criteria $H_c$ and the generated customized product catalogue data may be inserted as a data record 242 (FIG. 2A) into the knowledge base 332, where the customized product catalogue constitutes the data component 242a of the data record and $H_c$ constitutes the DB key 242b portion of the data record.

It is noted that the knowledge base 332 contains no entries at first. As explained, the knowledge base 332 is populated with knowledge (e.g., customized product catalogue data) as users make use of the system. As can be appreciated, the knowledge base 332 reaches its full potential when it matures, that is, at a stage when the contents of the knowledge base reach a certain predefined threshold. Upon reaching such a threshold, the KB manager 322 may be able to make decisions on what has to be done in terms of which processes have to be executed during the retrieval.

In accordance with aspects of the present invention, the DB manager 222 may handle certain exceptions. For example, the user 312 may specify a particular product. Accordingly, certain for the foregoing steps may be omitted so that the customized product catalogue omits extraneous goods/services.

Network connectivity and bandwidth may present some of the major problems in a mobile web application. Accordingly, when there are bandwidth and network connectivity problems, embodiments in accordance with the present invention should be able to adapt and utilize the mobile device profile to manage any trade-offs between data transfer and useful product catalogue information. For example, if displaying a product image can take a long time because of connectivity problems, the process can decide to display only text. This will be done in order to assist the user 312 to arrive at the goal quickly despite the connectivity hiccups.

It may be desirable to present a default product catalogue in the event that some pre-conditions for successful execution are not met. For example, when a new customer without purchasing history and preferred suppliers launches the m-commerce application 316, they will have little to no history on which to create a customized product catalogue. Accordingly, a default optimal catalogue may be generated and sent to the mobile device 314.

In some embodiments, an m-commerce application may detect purchasing opportunities from specific retailers; e.g., amazon.com, eBay, etc. In an embodiment, if the user launches the m-commerce application and then navigates to a particular retailer web site (e.g., amazon.com), then a customized product catalogue of that retailer's products may be presented to the user if the retailer provides suitable supplier information and product information in the appropriate databases discussed above. Accordingly, purchase activity with the retailer may then be captured and fed into the KB 332 (FIG. 3). In embodiments, the user may choose which retailers they want to interact with so that they receive customized catalog information when they visit those retailers;' web sites and not others.

Figure 8:
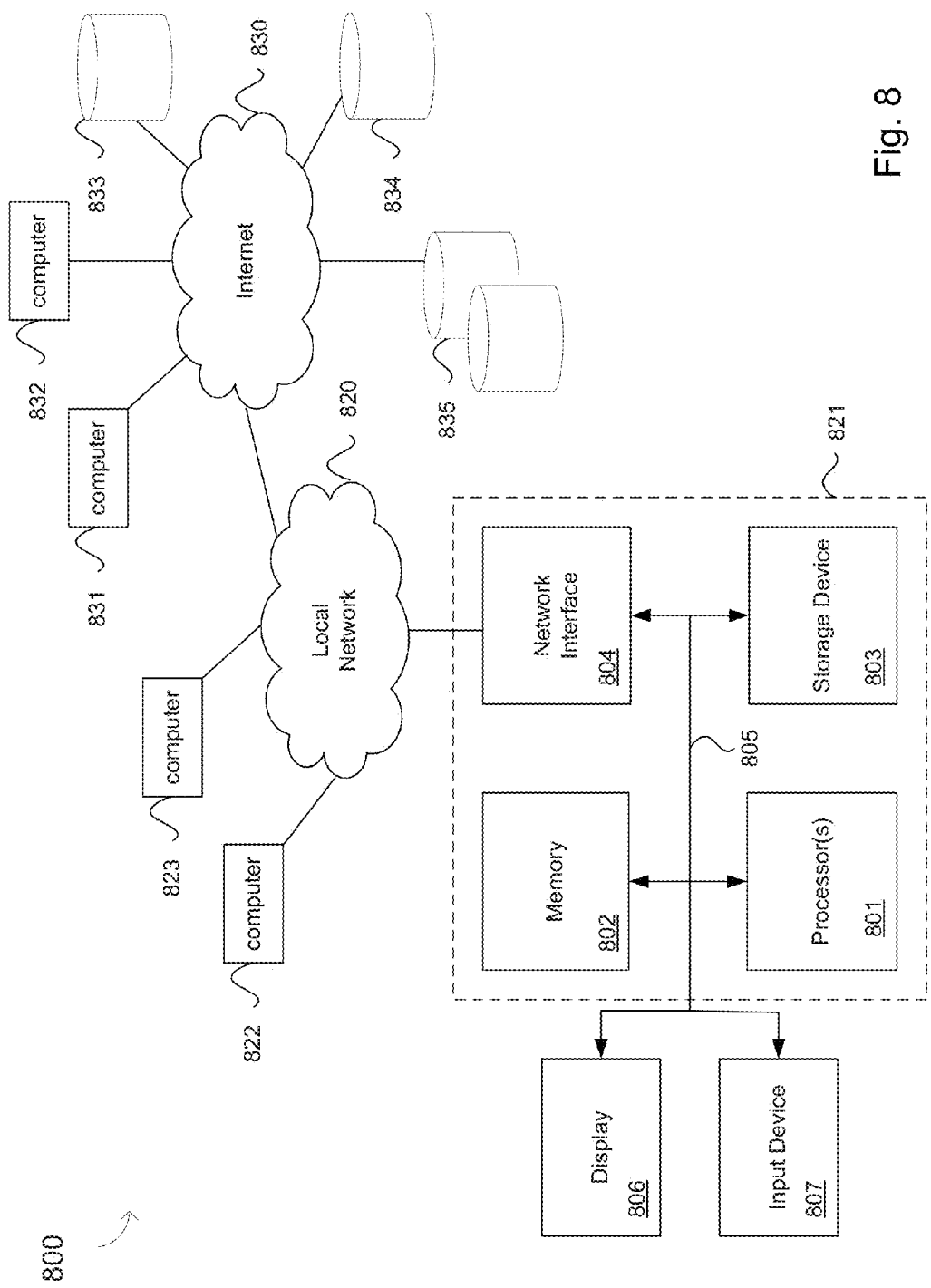
FIG. 8 is a high level system diagram configured in accordance with aspects of the present invention.

Referring to FIG. 8, in embodiments, a computer system 800 may be configured to operate in accordance with aspects of the present invention. For example, the processing segments 220, 320 and data repositories 230, 330 may comprise computer system 800. The managers 222, 322 and updater 224, 324 each may comprise one or more server components 821-823. In embodiments, the mobile device 214, 314 may communicate with the server components 821-823 over the Internet 830 using public or private cellular telephone communication protocols, using Wi-Fi™ connections, and so on.

A server component 821, may include a data processor subsystem 801 comprising one or more data processing units. A memory subsystem 802 may comprise random access memory (usually volatile memory such as DRAM) and non-volatile memory such as FLASH memory, ROM, and so on. A storage subsystem 803 may comprise one or more mass storage devices such as hard disk drives and the like. The storage subsystem 803 may include remote storage systems; e.g., for data mirroring, remote backup and such. A network interface subsystem 804 may connect the server component 821 to a local area network 820. A system of buses 805 can interconnect the foregoing subsystems, providing control lines, data lines, and/or voltage supply lines to/from the various subsystems. The computer system 800 may include a suitable display(s) 812 and input devices 811 such as a keyboard and a mouse input device for administrative access.

The memory subsystem 802 may have stored in the nonvolatile memory computer executable programs, which when executed can cause the data processing subsystem 801 to operate in accordance with aspects of the present invention. For example, the memory subsystem 802 may include computer executable programs that cause the processor 801 to operate as a KB manager 322, or a KB updater 324, and so on. The storage subsystem 803 may provide storage of the various database components such as knowledge base 332.

The local area network 820 may connect to the Internet 830 to access data sources 833-835 that comprise the data repositories 230 and 330; e.g., product catalogues or the WURFL. The local area network 820 may also provide access to external computers 831 and 832; e.g., merchant systems and the like.

Various advantages result from the present invention.
Optimal Use of Processing Power and Optimal Search Results Mobile devices suffer from limitations such as limited processing power, limited bandwidth and sometimes fluctuations in network connectivity. This results in poor service especially when there is need for repetitive data transfer between the device and the backend processes. Embodiments in accordance with the present invention can help to eliminate this repetitive data transfer by utilizing context at the backend processing in order to bring more focused contextual product catalogue search results. This ensures optimal use of processing power and bandwidth by pushing all the required heavy processing to be completed in the backend using high powered computers and only a small subset of the product catalogue data being transferred and presented as results.
Takes into Consideration Presentation Capabilities of the Device Right at Retrieval A common problem in mobile computing is how to manage the constrained and varying screen sizes and resolutions of the devices. This brings about a need for proper design of the UI more necessary as compared to applications designed to run on a desktop. Existing search techniques do not take into consideration the presentation of the data right at the beginning of the search; this problem is dealt with when the data to display is retrieved. Processing in accordance with principles of the present invention ensures that only relevant content is made available for presentation on the mobile user interface. This will ensure optimal presentation, that is, no further filtering will be required during presentation. Furthermore, embodiments may ensure that mobile device performance with regard to presentation of the product catalogue information is optimized.
Less User Input During the Search Generally, search algorithms are complemented by users refining their searching criteria a number of times during the search operation. For a desktop application this is acceptable as the input modes are highly usable, for example, the use of mouse and keyboard. However, in a mobile context this process is time consuming and annoying to users. Users tend to abandon the whole search operation because they find it difficult to use the constrained user input modes to refine search criteria using a mobile phone. Processing in accordance with aspects of the present invention will help to eliminate the repeated use of user input to refine the search by using the outlined context information to automatically refine the search criteria for the users. Furthermore, research indicates that eliciting user preferences poses a great challenge in online environment. The disclosed embodiments utilize few user-explicitly provided preferences, and as such, it avoids the problem of users providing preferences that do not truly reflect their opinions.
Some Embodiments of the Present Invention Deal with the Retrieval of a Special Type of Data, Product Catalogue Data for Display on a Mobile Device Product catalogue data is a special type of data in a sense that the records in a product catalogue contain different types of information with different meaning and purpose. For example, graphics or product images are used to give a quick picture of the product; however, this information is usually supported by other descriptions like price, availability and further description of the product. This means that the retrieval and presentation of product catalogue information has to be done in a way that the retrieved product catalogue information is meaningful and useful to assist the user in making a purchasing decision. In accordance with the present invention, contextual mobile information retrieval techniques have been utilized to come up with concise, meaningful and useful product catalogue data for display on a mobile device.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of providing product catalogue information to a mobile device, the method comprising configuring a computer system with computer executable program instructions operative to cause the computer system to perform steps of:
receiving from the mobile device location information representative of a location of a user of the mobile device;
receiving from the mobile device contextual information comprising information about the user's current environment and information about the mobile device's current operating conditions;
accessing a database of product catalogues comprising product catalogue data for a plurality of suppliers;
generating a search key using the location information and the context information to search the database of product catalogues;
retrieving one or more data records from the database of product catalogues using the search key; and
if a data record is retrieved from the database of product catalogues using the search key, then generating a compiled product catalogue comprising product catalogue data from the plurality of suppliers using the one or more data records and sending the compiled product catalogue to the mobile device;
if no data records are retrieved from the database of product catalogues using the search key, then storing a new data record in the database comprising steps of:
obtaining one or more product entries from among one or more source product catalogues from among one or more suppliers, wherein the product entries, the source product catalogues, and the suppliers are identified based on the parameters of the search key;
generating a newly compiled product catalogue using the obtained one or more product entries, wherein content comprising the newly compiled product catalogue is customized in accordance with the parameters of the search key;

storing as a new data record in the database; and establishing, in the database, an association between the search key and the new data record.

2. The method of claim 1 further comprising configuring the computer system with computer executable program instructions to cause the computer system to perform steps of:

obtaining user preferences of the user; and obtaining device characteristics of the mobile device, wherein the parameters that comprise the search key further include at least some of the user preferences of the user and at least some of the device characteristics of the mobile device.

3. The method of claim 2 wherein the one or more suppliers are identified using the location information and some of the user preferences included among the parameters of the search key.

4. The method of claim 2 wherein the one or more source product catalogues are identified using some of the user preferences and some of the device characteristics included in the parameters of the search key.

5. The method of claim 1 further comprising configuring the computer system with computer executable program instructions to cause the computer system to perform a step of obtaining user preferences of the user, wherein the parameters that comprise the search key further include at least some of the user preferences of the user.

6. The method of claim 5 further comprising configuring the computer system with computer executable program instructions to cause the computer system to perform a step of receiving from the mobile device information that identifies the user and using the information to obtain the user preferences of the user.

7. The method of claim 1 further comprising configuring the computer system with computer executable program instructions to cause the computer system to perform a step of obtaining device characteristics of the mobile device, wherein the parameters that comprise the search key further include at least some of the device characteristics of the mobile device.

8. The method of claim 7 further comprising configuring the computer system with computer executable program instructions to cause the computer system to perform a step of receiving from the mobile device information that identifies a device type of the mobile device and using the information to obtain the device characteristics of the mobile device.

9. The method of claim 1 wherein the one or more suppliers are identified using the location information included among the parameters of the search key.

10. The method of claim 1 wherein the database further comprises a plurality of keys, each key being associated with a data record, wherein the step of using the search key to search a database comprises determining a degree of match between the search key and each key in the database, the method further comprising configuring the computer system with computer executable program instructions to cause the computer system to perform, when the search key is deemed to have a partial match with one of the keys, steps of:

modifying one or more of the parameters of the search key and performing another search on the database; or storing a new data record in the database.

11. A computer system comprising a processing segment and a data repository, the data repository comprising a database having stored thereon a plurality of data records, each data record comprising a compiled product catalogue, the processing segment comprising a computer processor and computer executable program instructions which, when executed by the computer processor, is operative to cause the computer processor to:

receive location information from a mobile device, the location information representative of a location of a user of the mobile device;

receive from the mobile device contextual information comprising information about the user's current environment and information about the mobile device's current operating conditions;

access a database of product catalogues comprising product catalogue data for a plurality of suppliers;

generate a search key using the location information and the context information to search the database of product catalogues;

retrieve one or more data records from the database of product catalogues using the search key; and generate a compiled product catalogue comprising product catalogue data from the plurality of suppliers using the one or more data records and send the compiled product catalogue to the mobile device, if a data record is retrieved from the database of product catalogues using the search key;

store a new data record in the database comprising, if no data records are retrieved from the database using the search key, by performing steps of:

obtaining one or more product entries from among one or more source product catalogues from among one or more suppliers, wherein the product entries, the source product catalogues, and the suppliers are identified based on the parameters of the search key;

generating a newly compiled product catalogue using the obtained one or more product entries, wherein content comprising the newly compiled product catalogue is customized in accordance with the parameters of the search key;

storing as a new data record in the database; and establishing, in the database, an association between the search key and the new data record.

12. The computer system of claim 11 further comprising computer executable program instructions which, when executed by the computer processor, is operative to cause the computer processor to:

obtain user characteristics of the user; and obtain device characteristics of the mobile device, wherein the parameters that comprise the search key further include at least some of the user characteristics of the user and at least some of the device characteristics of the mobile device.

13. The computer system of claim 12 wherein the one or more suppliers are identified using the location information and some of the user characteristics included among the parameters of the search key.

14. The computer system of claim 12 wherein the one or more source product catalogues are identified using some of the user characteristics and some of the device characteristics included in the parameters of the search key.

15. The computer system of claim 11 wherein the database further comprises a plurality of keys, each key being associated with a data record, wherein the step of using the search key to search a database comprises determining a degree of match between the search key and each key in the database, the computer system further comprising computer executable program instructions which, when executed by the computer processor, is operative to cause the computer processor to:
modify one or more of the parameters of the search key and performing another search on the database; or
store a new data record in the database.

16. A method of delivering data content to a mobile device comprising:
a computer receiving from the mobile device state information comprising location information and context information, the location information indicative of a location of a user of the mobile device, the context information comprising information about the user's current environment and information about the mobile device's current operating condition;
the computer accessing a database of product catalogues comprising product catalogue data for a plurality of suppliers;
the computer generating a search key using the location information and the context information to search the database of product catalogues;
the computer retrieving one or more data records from the database of product catalogues using the search key;
when a search of the database using the search key results in retrieved data content, then the computer generating a compiled product catalogue comprising product catalogue data from the plurality of suppliers using the one or more data records and sending the compiled product catalogue to the mobile device; and
when a search of the database using the search key does not result in any retrieved data content, then:
the computer collecting data from one or more data sources using the state information to determine the data to be collected,
the computer adding data collected from the one or more data sources to the database as new data content; and
the computer associating the new data content with the search key.

17. The method of claim 16 wherein generating a search key includes retrieving the user's user profile information, wherein the search key comprises the location information, at least some of the context information, and at least some of the user profile information.

18. The method of claim 17 wherein the search key further comprises device profile information of the mobile device.

19. The method of claim 16 wherein the database further comprises a plurality of keys, each key being associated with a data record, wherein a search of the database using the search key comprises determining a degree of match between the search key and each key in the database,
wherein, when the search key is deemed to have a partial match with one of the keys, then:
the computer modifying one or more of the parameters of the search key and performing another search on the database; or
the computer storing new data content in the database.

* * * * *